United States Patent [19]

Nicks et al.

[11] B 3,985,700

[45] Oct. 12, 1976

[54] PROCESS FOR THE PRODUCTION OF A DISPERSION OF CONDENSATION POLYMER PARTICLES CONTAINING A MODIFYING AGENT

[75] Inventors: Peter Francis Nicks, Maidenhead; Peter George Osborn, Bourne End; Morice William Thompson, Maidenhead; Patricia Lesley James, Kingswinsford, all of England

[73] Assignee: Imperial Chemical Industries Limited, London, England

[22] Filed: June 13, 1974

[21] Appl. No.: 479,175

[44] Published under the second Trial Voluntary Protest Program on February 17, 1976 as document No. B 479,175.

[30] Foreign Application Priority Data

June 18, 1973 United Kingdom............... 28838/73

[52] U.S. Cl. ........................ 260/33.6 R; 260/33.8 R; 260/34.2; 260/37 R; 260/37 N; 260/37 PC; 260/37 P

[51] Int. Cl.².......................... C08J 3/02; C08J 3/20; C08K 5/01; C08K 5/02

[58] Field of Search .................. 260/33.6 R, 33.8 R, 260/34.2

[56] References Cited

UNITED STATES PATENTS

| | | | |
|---|---|---|---|
| 3,007,891 | 11/1961 | Gerstenberg et al. | 260/40 P |
| 3,007,892 | 11/1961 | Gruschke et al. | 260/40 P |
| 3,372,138 | 3/1968 | Bowman et al. | 260/40 P |
| 3,383,352 | 5/1968 | Duell et al. | 260/33.6 R |
| 3,433,753 | 3/1969 | Farkas et al. | 260/33.6 R |
| 3,505,268 | 4/1970 | Backhouse et al. | 260/34.2 |
| 3,532,663 | 10/1970 | Nicks et al. | 260/34.2 |
| 3,759,864 | 9/1973 | Nicks | 260/40 R |
| 3,879,335 | 4/1975 | Storck et al. | 260/34.2 |

*Primary Examiner*—Allan Lieberman
*Attorney, Agent, or Firm*—Cushman, Darby & Cushman

[57] ABSTRACT

A process is described for producing a dispersion of a condensation polymer in a hydrocarbon or chlorinated hydrocarbon liquid in which the polymer is insoluble, the disperse particles of polymer incorporating a pigment, filler or like modifying agent. At least one of the reactants from which the polymer is to be derived is heated in the liquid in the form of the liquid disperse phase of an emulsion in that liquid, made with the aid of a specified emulsifying agent, and the modifying agent is dispersed in that liquid disperse phase prior to completion of the polymer-forming reaction.

12 Claims, No Drawings

PROCESS FOR THE PRODUCTION OF A DISPERSION OF CONDENSATION POLYMER PARTICLES CONTAINING A MODIFYING AGENT

This invention relates to a process for the production of dispersions of pigmented or otherwise modified particles of condensation polymers, more particularly to such a process in which the polymer is produced by polymerisation of one or more reactants in an organic liquid in which at least one of the reactants is present as an emulsified liquid disperse phase, and in which the resulting polymer is insoluble. The invention also relates to modified condensation polymer particles so obtained.

Methods have already been proposed for the preparation of dispersions of condensation polymers in organic liquids which are non-solvents for the polymers, employing as starting material one or more polymer-forming reactants which also may be insoluble in the organic liquid. In co-pending U.S. application Ser. No. 237,522, filed Mar. 23, 1972, now abandoned, there is described a process for making dispersions of condensation polymers in an organic liquid medium by heating in that medium at least one polymer-forming reactant which is insoluble therein and which is itself either a liquid at room temperature or can be melted by heating in the liquid medium so as to be in the liquid state at the temperature at which the condensation reaction takes place. Such a liquid reactant is emulsified in the organic liquid medium, before the start of the reaction, with the aid of an emulsifying agent which is a copolymer containing chain-like components of two types, one type being soluble in the liquid disperse phase of the emulsion (the polymer-forming reactant) and the other type being soluble in the liquid continuous phase (the organic liquid medium). The use of such copolymers as emulsifying agents is broadly described in British Patent No. 1,211,532; for the purpose of producing a condensation polymer dispersion, it is further necessary that one of the chain-like components of the copolymer which is soluble in the disperse phase should also be capable of associating with the condensation polymer product so as to stabilise the particles of the latter.

In co-pending U.S. application Ser. No. 478,831, filed June 12, 1974 there is described a modification of the above process in which a polymer-forming reactant insoluble in the dispersion liquid is dissolved in a second, inert liquid which is substantially immiscible with the liquid medium in which the polymer dispersion is to be produced, and the resulting solution of the reactant is emulsified in the liquid medium before heating to effect the condensation reaction. The second, solvent, liquid is removed by distillation either during or subsequent to the reaction.

We have now found that, in either of these polymerisation processes where a polymer-forming reactant is present during the polymerisation reaction as an emulsified liquid disperse phase, it is possible to obtain dispersions of polymer particles containing dyestuffs, pigments, metallic powders or other normally solid modifying agents by dissolving or dispersing these materials in the emulsified liquid disperse phase prior to the completion of the polymerisation reaction.

Thus according to the present invention there is provided a process for the production of a dispersion of condensation polymer particles in a hydrocarbon or chlorinated hydrocarbon liquid medium in which the polymer is insoluble, wherein the disperse particles of polymer incorporate at least one modifying agent for the polymer, the process comprising heating in the said liquid medium at polymerisation temperature an appropriate condensation polymer-forming reactant or reactants, the reactant or at least one of the reactants being present as a liquid disperse phase in an emulsion as hereinafter defined, one of the chain-like components of an emulsifying agent present which is soluble in a disperse phase being also capable of associating with the polymer produced, dispersing in the said liquid phase of the emulsion prior to completion of the polymer-forming condensation reaction the modifying agent or agents and then completing the polymer-forming reaction.

By "emulsion" is herein meant an emulsion as described and claimed in British Patent No. 1,211,532, that is to say an emulsion of a liquid disperse phase in a liquid continuous phase in which the emulsifying agent is a polymeric material containing in its molecule at least one chain-like component of a type which is soluble and non-self-associated in the liquid of the disperse phase and at least one chain-like component of another type which is soluble and non-self-associated in the liquid of the continuous phase, the average molecular weight of the individual components being at least 1,000, the total molecular weight of the individual components of each type being at least 3,000 or at least $n \times 1,000$, where n is the number of the individual components of the other type, whichever is the higher, and the ratio of the total weights of the individual components of the two types being from 3:1 to 1:3. The disclosure of British Patent No. 1,211,532 is to be understood as being incorporated herein by reference.

By referring to the polymer as being "insoluble" in the organic liquid medium we mean that it is sufficiently immiscible therewith to form a separate phase.

A polymer-forming reactant which is present in the process of the invention as an emulsified disperse phase may be a reactant which is liquid at normal temperatures, or a reactant which can be melted by heating in the hydrocarbon or chlorinated hydrocarbon liquid medium in which the dispersion is to be formed to a temperature not higher than the polymerisation temperature. It may alternatively be a solid which cannot be melted at the temperature of reaction, but which can be dissolved in a second, inert, liquid which is substantially immiscible with the liquid medium in which the dispersion is to be formed, in which case the resulting solution of the reactant constitutes the liquid disperse phase of the emulsion which is formed during the carrying out of the process. It is not essential that such a solid reactant should be soluble in the chosen second liquid at room temperature, but it should be sufficiently soluble therein at the reaction temperature to ensure that no solid phase material remains when reaction commences. It is also not essential that the reactant which is present as a liquid disperse phase should have a negligible solubility in the continuous phase (the liquid medium in which the dispersion is to be formed), although in the majority of cases this will in practice be the situation. However, where the reactant in question is appreciably soluble in the hydrocarbon or chlorinated hydrocarbon dispersion medium, its partitioning in the emulsion should be strongly in favour of the disperse phase (i.e. the second liquid).

In general, the process of the invention may be used for the production of dispersions of pigmented or like-modified particles of any type of condensation polymer, that is to say, a polymer in which the links between the repeating units involve atoms other than exclusively carbon atoms, and during the formation of which from one or more reactive intermediates a low-molecular weight by-product is eliminated.

The condensation polymer-forming reactant or reactants may in general be either monomeric compounds or very low polymers comprising a small number of repeating units of the type occurring in the final disperse polymer. Where the polymer-forming reaction involves more than a single reactant which is to be present as an emulsified liquid disperse phase, each such reactant may provide a distinct liquid disperse phase, and where more than one of the disperse phases consists of an emulsified solution of a reactant in a second inert liquid, the same inert liquid may be employed for all the reactants or alternatively each reactant may be dissolved in a different inert liquid immiscible with the liquid medium of the dispersion, as described in our co-pending application Ser. No. 478,831.

Where the polymer-forming reaction involves two or more reactants, it is not necessary that all these should initially be present, or be capable of being present, in the reaction mixture as emulsified liquid disperse phases. For example, such reactants may be added gradually as the reaction proceeds, and they may be soluble in the hydrocarbon or chlorinated hydrocarbon liquid medium of the dispersion. However, any addition of further reactants to the pre-formed emulsion is preferably carried out under conditions of rigorous shearing and at such a rate that reaction to give the desired polymer takes place without the emulsion becoming unstable.

Hydrocarbon liquids which are useful as the liquid medium in performing the process of the invention are aliphatic and aromatic hydrocarbons, for example hexane, heptane, octane, cyclohexane, benzene, toluene, xylene and mesitylene, and mixtures of these including commercially available petroleum distillate fractions having boiling ranges up to about 250°C and containing up to about 90 percent of aromatic hydrocarbons. Chlorinated hydrocarbons which are suitable include carbon tetrachloride, tetrachlorethane, pentachlorethane, chlorobenzene, dichlorobenzene and trichlorobenzene.

Having regard to the generally polar character of reactants suitable for forming condensation polymers, where a second inert liquid is required, to act as a solvent for such a reactant, that second liquid will usually also be polar. Where the main liquid of the dispersion is an aliphatic hydrocarbon, or a predominantly aliphatic hydrocarbon mixture, suitable polar second liquids include lower alcohols and glycols, such as methanol, ethylene glycol, butane diol, xylylene glycol, propylene glycol, butane triol, trimethylolpropane, cyclohexane diol, triethanolamine, formamide, dimethyl-formamide, and monohydric phenols and their substituted derivatives. Where the dispersion liquid is an aromatic hydrocarbon, or a predominantly aromatic hydrocarbon mixture, or is a chlorinated hydrocarbon, suitable polar second liquids include water and lower glycols such as ethylene glycol and propylene glycol.

The characteristics of the emulsifying agent which are necessary for the formation of a stable emulsion of a reactant, or a solution of a reactant in a seconnd inert liquid, are set out in detail in British Patent No. 1,211,532. According to that patent, the emulsifying agent may be a simple block copolymer consisting of two chain-like components, one of each type as described above. In this case the molecular weight of each component must be at least 3,000. The components may be of higher molecular weights, the upper limit being set only by the practical difficulties of making block copolymers containing high molecular weight components. Alternatively, the agent may be a copolymer comprising a polymeric backbone providing one type of component and carrying, as one or more side chains, components of the other type (a "comb" type copolymer).

This type of copolymer may be made by conventional graft polymerisation or by copolymerisation of a monomer, which will form the backbone, with a soluble chain-like component of molecular weight at least 1,000 and preferably at least 1,500 having an ethylenically unsaturated group. Copolymerisation results in attachment of the chain-like component to the backbone. Another alternative is to copolymerise two types of chain-like component, each having an unsaturated group so as to produce a polymer backbone from which are pendent the two types of chain-like components required in the emulsifying agent (a "double comb" type copolymer). Where there is only one side chain then the backbone provides one component and the side chain the other, both being of molecular weight at least 3,000. Where there are two or more side chains of one type of component their total molecular weight must be at least 3,000 and the average molecular weight of the components of that type must be at least 1,000. Where there are $n$ side chains and $n$ is greater than 3, then the molecular weight of the backbone must be at least $n \times 1,000$, preferably at least $n \times 1,500$. A single emulsifying agent or more than one such agent may be present as required.

It is also necessary that the emulsifying agent, or at least one of the emulsifying agents, if more than one is used, should comprise a chain-like component which is not only soluble and non-self-associated in a reactant disperse phase but is also capable of becoming associated with the polymer product so that the emulsifying agent molecule as a whole becomes anchored to the particles of the product and the latter are thereby stabilised as a dispersion in the liquid medium. Such a capability may be introduced, for example, by providing the disperse phase-soluble component of the emulsifying agent with polar groups which can interact with complementary polar groups in the polymer produced. Alternatively, it may be arranged that the disperse phase-soluble component comprises a polymeric chain of the same or similar chemical composition as that of the polymer produced, so that this component becomes entangled in, and hence integrally associated with, the chains of the polymer produced. Another procedure is to employ an emulsifying agent which is of a composition satisfying the requirements for formation of a stable reactant emulsion and which also possesses reactive sites on the disperse phase-soluble component which are capable of participating in the polymerisation reaction. For example, the component in question may be provided with carboxylic acid or hydroxyl groups which can take part in a condensation reaction between a polyol and a polybasic acid. In this way a polymeric chain of the required characteristics for association with the polymer product is built up during the actual polymerisation.

The modifying agent or agents employed in the process of the invention comprise in particular pigments and dyestuffs the use of which is well-known in the polymer art, whereby the resultant dispersions will contain disperse particles of white or coloured polymer. Examples of such materials include organic pigments such as phthalocyanine blue and phthalocyanine green, inorganic pigments such as iron oxide and titanium dioxide, and dyestuffs such as C.I. Disperse Orange 30, C.I. Disperse Yellow 126, C.I. Disperse Blue 183 and C.I. Solvent Red 52. Other suitable modifying agents are metallic powders or flakes, for example of aluminum, and fillers such as kaolin, forms of silica such as β-crystobalite, and Portland cement.

In general, pigments, metal particles and fillers will be insoluble in the emulsified liquid disperse phase of the reaction mixture whereas dyestuffs may be either soluble or insoluble therein. In the case of a soluble dyestuff, it may be soluble in either the polymer-forming reactant present in the liquid disperse phase or (where appropriate) in the liquid wherein the reactant is dissolved to form the disperse phase, or in both.

The modifying agent is preferably incorporated in the reaction mixture before polymerisation commences, although in suitable cases it may be added to the mixture at an intermediate stage of polymerisation, whilst the degree of polymerisation is still relatively low. A convenient procedure is to dissolve or disperse the modifying agent in the liquid polymer-forming reactant, or in one such reactant prior to emulsification of the reactant in the liquid medium; where a second liquid is used to dissolve the polymer-forming reactant, the modifying agent may be dissolved or dispersed in the solution of the reactant before emulsification is carried out, or in the second liquid itself before the reactant is dissolved therein. An insoluble modifying agent such as a pigment or metal flakes may be milled with the liquid reactant or solution by any of the procedures commonly used for dispersing pigments in the paint industry, such as ball-milling or bead-milling. The effective dispersion of an insoluble modifying agent may require the presence of a suitable dispersing agent, which in general will be a substance of amphipathic character having a component which is solvatable by the liquid (whether polymer-forming reactant, second liquid or solution) in which the modifying agent is to be dispersed, and another component which is capable of becoming anchored to the particles of the modifying agent. Examples of suitable dispersing agents include calcium polyphosphate, where water is used as the second liquid, and comb type graft copolymer dispersants having polyvinyl pyrrolidone or (methoxy) polyethylene glycol side chains where the second liquid is methanol or ethylene glycol. Other suitable dispersing agents are the polymeric dispersants described in our British Patent Specification Nos. 1,108,261 and 1,159,252, that is to say respectively dispersants having the structure

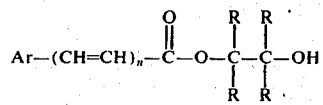

in which Ar is an aromatic group, n is 1 or 0, from two to three R groups are individually H, CH$_3$ or C$_2$H$_5$ and the remaining R group or groups individually or the remaining R—C—C—R group in combination provides a chain-like component of at least 12 links which is solvatable by the liquid in which the modifying agent is to be dispersed, and dispersants which comprise an addition polymer chain which is solvatable by the liquid in which the modifying agent is to be dispersed and has attached thereto at least one group of the formula

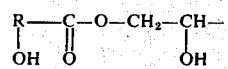

where R is an aliphatic radical which may contain one or more additional hydroxyl groups.

Stable, pigmented or otherwise modified dispersions of condensation polymers can be obtained by the process of the invention in which the disperse particles are of a broad range of sizes. Depending chiefly on the efficiency of the initial emulsification step, but also on control of the polymerisation reaction, modified particles as large as 100μ or as small as 0.1μ may be produced. A normal size range for the product is 0.1–10μ.

As already indicated, condensation polymer-forming reactants suitable for use in the present invention are those participating in condensation-type reactions in which a low molecular weight by-product is eliminated and the resulting polymer incorporates hetero-atoms in the links between repeat units. Typical examples of such reactants include polybasic acids and their reactive derivatives such as anhydrides and acid halides, in conjunction with polyols or polyamines with which they will react to produce polyesters and polyamides respectively. Examples of suitable polyacids or derivatives thereof include adipic acid, azelaic acid, succinic anhydride, phthalic anhydride, isophthalic acid, terephthalic acid, tri-mellitic acid, pyromellitic acid, 1:3 and 1:4-cyclohexane dicarboxylic acids and mixtures thereof, as well as inorganic acids such as orthophosphoric acid. Suitable polyols include ethylene glycol, diethylene glycol, trimethylene glycol, tetramethylene glycol, hexamethylene glycol, tetramethyl ethylene glycol, neopentyl glycol, trimethylolpropane, glycerol, 1:3- and 1:4- cyclohexane diol and p-xylylene glycol, as well as hydroquinone and other polyhydric phenols. Suitable polyamines include ethylene diamine, hexamethylene diamine, decamethylene diamine, diethylene triamine, piperazine, p-xylylene diamine, and phenylene diamines.

Other suitable polymer-forming reactants are diaryl carbonates, such as diphenylcarbonate, and bisphenols, such as diphenylolpropane, which can react together with the formation of aromatic polycarbonates.

Certain single polymer-forming reactants are also included, such as those containing two mutually reactive groups in a single molecule, for example 11-aminoundecanoic acid, or those which are pre-formed initial reaction products of a polyacid and a polyol or a polyamine, for example bis(hydroxyethyl) terephthalate or hexamethylene diammonium adipate (nylon 66 salt).

It will be understood from the description above that the emulsifying agent functions by virtue of its having one polymeric component which is soluble in the hydrocarbon or chlorinated hydrocarbon liquid, which constitutes the first liquid or continuous phase of the emulsion as hereinbefore defined, and another polymeric component which is soluble in the liquid resistant, or in the solution of the reactant in a second liquid as the case may be, which constitutes the disperse phase of the emulsion. These two types of component are combined in a single molecule, and each component is chosen in accordance with the principles set out in British Patent No. 1,211,532.

The chain-like component of the emulsifying agent which is to be soluble in the hydrocarbon or chlorinated hydrocarbon medium will in general be a polymer chain of relatively low polarity. These appropriate components for use in conjunction with aliphatic hydrocarbons include:

Polymers of long chain esters of unsaturated acids, e.g. stearyl, lauryl, octyl, 2-ethyl hexyl, hexyl and butyl esters of acrylic and methacrylic acids; polymers of vinyl esters of long chain acids, e.g. vinyl stearate and vinyl esters of branched tertiary carboxylic acids such as those sold under the registered trade mark "Versatic" acid; polymeric vinyl alkyl ethers of polyalkylene oxides, e.g. polypropylene oxide of molecular weight 1,000 – 3,000; polymers of butadiene and isoprene and non-crystalline polymers of ethylene and propylene; self-polyesters (of molecular weight greater than 1,000) of hydroxy fatty acids, e.g. 12-OH stearic acid, hydrogenated castor oil fatty acids and the hydroxy acids of carnauba wax; polyesters of di-acids with diols, e.g. polyesters of sebacic acid with 1,12-dodecane diol or of adipic acid with neo-pentyl glycol.

Where the liquid medium of the dispersion is mainly aromatic hydrocarbon or chlorinated hydrocarbon in nature, the above types of soluble components may again be used and, in addition, shorter chain analogues, e.g. polymers of ethoxyethyl methacrylate, methyl methacrylate and ethyl acrylate, as well as aromatic polyesters, such as non-drying oil-modified alkyd resins and polymers of styrene, vinyl toluene and tert-butylstyrene.

The chain-like component of the emulsifying agent which is to be soluble in the liquid reactant, or in the solution of the reactant in the second liquid, will in general be a polymer chain of higher polarity than the component first described, since, as already mentioned, condensation polymer-forming reactants in general tend to be of relatively high polarity, and the same is true of liquids in which they are soluble, such as water or lower alcohols and glycols. Suitable chain-like components for this function include the following:

Polyethylene oxide condensates, either hydroxyl-terminated or methoxyl-terminated; polymers of vinyl pyrrolidone and copolymers thereof; polymers containing dimethylaminoethyl methacrylate or diethyl aminoethyl methacrylate as the salt, e.g. the hydrochloride, if desired; polymers containing methacrylamide or acrylamide; polymers containing substantial quantities of carboxyl group, e.g. polymers containing methacrylic acid, acrylic acid, or itaconic acid, either as the free acid or solubilised by means of a change in pH of the solution, i.e. formation of the sodium, potassium, ammonium or organic amine salt.

The requirement that the emulsifying agent used in the process of the present invention should comprise a chain-like component which is both soluble in the liquid reactant, or the solution of the reactant in the second liquid, and capable of becoming associated with the condensation polymer produced may call for the presence in the molecule of the emulsifying agent of a third type of component additional to the two types of component which have just been discussed, such third type of component functioning in one or more of the ways mentioned previously. However, in many cases it can be arranged that the component which is soluble in the reactant disperse phase inherently possesses this "anchoring" ability. Indeed, it is probable that any such soluble polymeric component will provide some degree of anchoring simply by virtue of the fact that it is present in a chain-extended state in the disperse liquid particles in which the polymerisation reaction is taking place; as a result, physical chain entanglement will occur of this component with the newly-formed condensation polymer molecules. It is preferred, however, that the component in question should contain some reactive grouping which enables it to participate in the condensation polymerisation reaction, as already described.

The proportion of emulsifying agent required will usually range from 1–10 percent by weight of the disperse phase, that is to say, the liquid reactant or the solution of the reactant in the second liquid. In general, the corresponding particle size of the disperse phase will be of the order of $2-0.1\mu$ dependent on the proportion of agent used and for particularly fine emulsions it is preferred to use emulsifying agent in a proportion of from 5–10 percent by weight of the disperse phase, which will produce particle sizes in the range $0.5-0.1\mu$.

The relative proportions of the various constituents used in performing the process of the invention may vary widely. However, a useful range of proportions of the modifying agent is from 0.5 to 80 percent by weight of the disperse polymer to be formed. The disperse phase of the emulsion in which polymerisation takes place may usefully constitute from 10 to 75 percent by volume of the total reaction composition (disperse phase plus continuous phase) and, where the disperse phase consists of a solution of a reactant in a second liquid, the concentration of the reactant therein may conveniently be from 10 to 90 percent by weight, consistent with the viscosity of the solution being low enough to permit its efficient emulsification in the dispersion liquid.

A catalyst, for example an esterification catalyst, may be used to reduce reaction times, especially near to the end of the reaction. Such materials are conveniently incorporated at the emulsification stage in the reactant disperse phase.

The temperature to which the polymer-forming reactant or reactants are heated in performing the process of the invention will in general be that at which the reactant or reactants are heated to effect normal bulk polymerisation, but in many cases it is not necessary to "force" the reaction by progressively increasing the temperature as is customary when operating in bulk. The liquid medium in which the process is carried out will, of course, be selected so that it (or any azeotrope it may form with a by-product) has a boiling point equal to or higher than the reaction temperature.

Pigmented or otherwise modified condensation polymer dispersions obtained by the process of the invention are of value for the production of coatings upon such substrates as glass fibre and textile materials; where the disperse polymer is capable of undergoing a subsequent cross-linking reaction, as for example in the case of a phenol-formaldehyde oligomer, the substrate to which the polymer has been applied may be subjected to a curing step. The dispersions are, however, especially useful for conversion into polymer powders, by evaporation of the continuous phase liquid or by filtration, decantation or centrifugation, depending on the particle size of the disperse phase. The powders obtained may be used, for example, in the manufacture of moulded articles or of fibres.

The invention is illustrated but not limited by the following Examples, in which parts and percentages are by weight:

EXAMPLE 1

The following were charged to a 2-liter baffled flask fitted with a reflux condenser, a Dean and Stark separator and a propeller-type stirrer:

| | |
|---|---|
| Bis(hydroxyethyl)terephthalate | 240 parts |
| TiO$_2$ concentrate (70%) in bis(hydroxyethyl)terephthalate | 40 parts |

The pigment concentrate was prepared by melting 37 parts of bis(hydroxyethyl)terephthalate in a heated Brabender pug mixer and then mixing in 100 parts of TiO$_2$ pigment.

The bis(hydroxyethyl)terephthalate and pigment concentrate were melted together and stirred for about 5 minutes. The following were mixed and added quickly to the preceding mixture:

| | |
|---|---|
| Aliphatic hydrocarbon (boiling range 230 – 250°C) | 420 parts |
| Graft copolymer emulsifying agent as described below (40.5% solution: 7% of copolymer on dispersed phase). | 48.4 parts |

The mix was heated to remelt the pigmented reactant and stirred vigorously to emulsify the melt. The emulsion was brought to reflux temperature and ethylene glycol from the polycondensation reaction was removed by azeotropic distillation. The condensation was complete in 2–3 hours.

On cooling, a 31% solids dispersion of poly(ethylene terephthalate) was obtained, containing 14% of the dispersed phase as TiO$_2$. The particle size distribution was 2–50$\mu$.

The graft copolymer emulsifying agent used in the above Example was obtained by reacting together the following ingredients: 885 parts of a 56.5% solution in toluene of methoxypolyethylene glycol molecular weight 750 reacted with glycidyl methacrylate to form a terminal methacrylate group, 2,000 parts of a 50% solution in aliphatic hydrocarbon of poly(12-hydroxystearic acid), molecular weight 1,500–2,000, reacted with glycidyl methacrylate to form a terminal methacrylate group, 500 parts of methyl methacrylate, 20 parts of azodi(isobutyronitrile), 20 parts of primary octyl mercaptan and 500 parts of toluene. This mixture was heated at reflux at 98°C under an atmosphere of nitrogen for 7 hours, following which a further 2 parts of azodi(isobutyronitrile) were added and refluxing was continued for 4 hours more. The final solids content of the graft copolymer solution so obtained was 40.5 percent.

EXAMPLE 2

Using the same apparatus as in Example 1, 252 parts of bis(hydroxyethyl)terephthalate were charged to the flask, melted and 28 parts of TiO$_2$ pigment were added with stirring. After 5 minutes a solution of the following was added:

| | |
|---|---|
| Aliphatic hydrocarbon (boiling range 230 – 250°C) | 420 parts |
| Graft copolymer emulsifying agent (40.5% solution) as in Example 1. | 48.4 parts |

The emulsification and polycondensation were carried out as described in Example 1 to obtain a similar dispersion of poly(ethylene terephthalate).

EXAMPLE 3

A pigmented dispersion was prepared as described in Example 2 except that the amount of bis(hydroxyethyl)terephthalate was increased to 280 parts and 1.4 parts of copper phthalocyanine pigment were used instead of the 28 parts of TiO$_2$. In this case the pigment was soluble in the molten reactant.

A 31% solids dispersion of poly(ethylene terephthalate) was obtained, blue in colour and containing 0.7% of the dispersed phase as copper phthalocyanine. The particle size distribution was 1–20$\mu$.

EXAMPLE 4

Further dispersions were prepared as described in Example 3, except that the copper phthalocyanine pigment was replaced by an equal weight of any one of the following dyes, which are stable in polyesters at the temperatures used in this process.

C.I. Disperse Orange 30
C.I. Disperse Yellow 126
C.I. Solvent Red 52
C.I. Disperse Blue 183

A range of coloured dispersions were thus obtained having the same properties as described for Example 3.

EXAMPLE 5

Using the same apparatus as described in Example 1, the following were charged to the flask:

| | |
|---|---|
| Bis(hydroxyethyl)terephthalate | 280 parts |
| Iron oxide dispersion (described below) (10% by weight of pigment) | 14 parts |

The charge was heated until molten, mixed well for 5–10 minutes and a solution of the following added quickly:

| | |
|---|---|
| Aliphatic hydrocarbon (boiling range 230 – 250°C) | 420 parts |
| Graft copolymer emulsifying agent (40.5% solution) as described in Example 1. | 48.4 parts |

The mix was heated to remelt the pigmented reactant and stirred vigorously to emulsify the melt, allowing lower boiling solvents to distil off. The polycondensation was carried out as described in Example 1.

A 31% solids dispersion of poly(ethylene terephthalate) was obtained, brown in colour and containing 0.7% of the dispersed phase as iron oxide. The particle size distribution was 2–50$\mu$.

The iron oxide used in the above Example was dispersed in a solution of a copolymer of methyl methacrylate, 2-ethoxyethyl methacrylate and glycidyl methacrylate esterified with p-nitrobenzoic acid (the weight ratio of components being 89/8/3), as generally described in British Patent Specification No. 1,108,261.

EXAMPLE 6

The following ingredients were mixed:

| | |
|---|---|
| Ethylene glycol | 640 parts |
| The dyestuff C.I. Acid Red 138 (0.5% on polymer to be formed) | 2.9 parts |
| 11-Aminoundecanoic acid | 640 parts |
| A solution of graft copolymer dispersing agent (42.4% solution) as described below | 40 parts |
| Aliphatic hydrocarbon (containing 15% aromatics) (boiling range 140 – 200°C). | 1,280 parts |

The mixture was heated to reflux under nitrogen with gentle stirring until the 11-aminoundecanoic acid had dissolved. The two liquid phases present were then emulsified with the aid of an emulsifying head and azetropic distillation was commenced to remove all the ethylene glycol and the water of reaction (57.5 parts). When the reaction was complete, the hot dispersion was cooled rapidly by passage through a heat exchanger, giving a fawn-red coloured dispersion of polyamide of 32% solids content having a particle size of 1–4µ.

The graft copolymer dispersing agent used in this Example was made by repeating the procedure described in Example 1.

EXAMPLE 7

To a reactor of 2 liters capacity fitted with a reflux condenser and Dean and Stark separator were charged the following ingredients:

| | |
|---|---|
| Kaolin | 35.5 g |
| Ethylene glycol | 480.0 g |
| 11-Aminoundecanoic acid | 160.0 g |
| Aliphatic hydrocarbon (boiling range 160 – 180°C) | 480.0 g |
| Dispersant (39.0% solids solution in hydrocarbon) (see below) | 30 g (6% based on amino acid taken) |

The reaction mixture was stirred rapidly and heated to boiling point. The 11-Aminoundecanoic acid dissolved in the ethylene glycol and a fine emulsion of this solution in the hydrocarbon, with the kaolin present in the disperse phase, was obtained. Over a period of 2 hours at 180°C, ethylene glycol and water of reaction were separated from the distillate until evolution was complete. A dispersion of poly(undecanoamide) of particle sizes 5–20µ, containing kaolin in the particles, resulted. Subsequent evaporation of the hydrocarbon from the dispersion gave a polymer powder which could be used to make reinforced mouldings.

The dispersant used in this Example was a "double comb" type copolymer having a poly(methyl methacrylate) backbone to which were grafted side chains of poly(12-hydroxystearic acid) and poly(ethylene glycol) respectively. The copolymer was made by copolymerising, in solution in aliphatic hydrocarbon in the ratios 18.5:55.5:25 by weight, the following monomers:

i. methoxy poly(ethylene glycol) of molecular weight 750 which had been reacted with glycidyl methacrylate to introduce a terminal methacrylate group;

ii. poly(12-hydroxystearic acid) of molecular weight 1,500–2,000 similarly reacted with glycidyl methacrylate;

iii. methyl methacrylate.

EXAMPLE 8

The procedure of Example 7 was repeated, but replacing the kaolin with 50 g of Portland cement powder. A similar polymer powder product was obtained.

EXAMPLE 9

The following ingredients:

| | |
|---|---|
| β-Crystobalite | 1532 g |
| Ethylene glycol | 1210 g |
| 11-Aminoundecanoic acid | 153 g |
| γ-Aminopropyl triethoxy silane | 3.7 g |
| "Comb" dispersant (37% solids solution in hydrocarbon) (see below) | 453 g (11% based on sand taken) | were ground in a ball mill for 72 hours to give a dispersion of the sand having a particle size of 1–5µ in the ethylene glycol. Further ethylene glycol (1800 g) and 11-aminoundecanoic acid (1400 g) were then added together with aliphatic hydrocarbon (4000 g) (boiling range 160°–180°C) and double comb dispersant (40% solids solution in hydrocarbon, 400 g). The mixture was degassed and then heated with rapid stirring to give an emulsion in the hydrocarbon of a solution of the 11-aminoundecanoic acid in the ethylene glycol. The ethylene glycol was distilled out by azeotropic distillation together with the water of reaction, yielding a dispersion of in the hydrocarbon poly(undecanoamide) containing β-crystobalite in the particles, which had a size of 5–10µ. The polymer powder obtained from the dispersion by evaporation of the hydrocarbon was useful for making reinforced mouldings.

The comb type dispersant used in this Example had side chains of poly(ethylene glycol) grafted on to a backbone of poly(methyl methacrylate-co-dimethylaminoethyl methacrylate). This copolymer was made by copolymerising, in solution in aliphatic hydrocarbon in the ratios 50:47.5:2.5 by weight, the following monomers:

i. methoxypoly(ethylene glycol) molecular weight 750 which had been reacted with glycidyl methacrylate to introduce a terminal methacrylate group;

ii. methyl methacrylate;

iii. dimethylaminoethyl methacrylate.

The double comb dispersant used in this Example was a copolymer similar to the dispersant used in Example 7 but with monomer weight ratios of 25:50:25.

EXAMPLE 10

The following ingredients were mixed in a 4-liter flask fitted with reflux condenser, Dean and Stark separator and emulsifying head:

| | |
|---|---|
| Diphenyl Carbonate | 428 g |
| Diphenylol propane | 456 g |
| Phenol | 500 g |
| Titanium dioxide (RCR 6 ex British Titan Products) | 50 g |
| Aliphatic hydrocarbon (boiling range 180 – 200°C) | 1,000 g |
| AB block copolymer dispersant (see below) | 100 g |

The reaction mixture was heated with stirring under nitrogen until the phenol had melted and dissolved the diphenylol propane and the diphenol carbonate. The emulsifier was then turned on, slowly at first to avoid frothing, and subsequently at 3,000 rpm. An emulsion of the phenol solution of the reactants in the aliphatic hydrocarbon was obtained, containing titanium dioxide pigment in the disperse phase. The emulsion was heated to boiling and the phenol distilled out azeotropically until no more was evolved. A dispersion resulted of pigmented polycarbonate having a particle size of 5–10$\mu$. The polymer powder obtained by evaporating the hydrocarbon from this dispersion could be used for making mouldings.

The AB block copolymer dispersant used in this Example consisted of blocks of poly(tert-butyl styrene) and poly(ethylene oxide) respectively, both of molecular weight 3,000, and was obtained by anionic polymerisation according to the technique described in Trans. Faraday Soc. 55, 1647 (1959).

EXAMPLE 11

The procedure of Example 7 was repeated, but using an equal weight of o-dichlorobenzene as the dispersion liquid medium in place of the aliphatic hydrocarbon. A similar result to that of Example 7 was obtained.

What we claim is:

1. A process for the production of a dispersion of condensation polymer particles in a hydrocarbon or chlorinated hydrocarbon liquid medium in which the polymer is insoluble, wherein the disperse particles of polymer are of a size from 0.1$\mu$ to 100$\mu$ and incorporate at least one modifying agent for the polymer, the process comprising heating in the said liquid medium at polymerisation temperature an appropriate condensation polymer-forming reactant or reactants, the reactant or at least one of the reactants being present as a liquid disperse phase in an emulsion of which the continuous phase is constituted by the said liquid medium and which is produced with the aid of from 1 to 10 percent by weight, based on the disperse phase, of an emulsifying agent which is a polymeric material containing in its molecule at least one chain-like component of a type which is soluble and non-self-associated in the liquid of the disperse phase and at least one chain-like component of another type which is soluble and non-self-associated in the liquid of the continuous phase, the average molecular weight of the individual components being at least 1,000, the total molecular weight of the individual components of each type being at least 3,000 or at least $n \times 1,000$ where $n$ is the number of the individual components of the other type, and the ratio of the total weights of the individual components of the two types being from 3:1 to 1:3, in addition one of the chain-like components of the emulsifying agent which is soluble in a disperse phase being also capable of associating with the polymer produced, dispersing in the said liquid phase of the emulsion prior to completion of the polymer-forming condensation reaction the modifying agent or agents and then completing the polymer-forming reaction.

2. A process as claimed in claim 1, wherein the modifying agent is a pigment or dyestuff.

3. A process as claimed in claim 1, wherein the modifying agent is incorporated in the reaction mixture before polymerisation commences.

4. A process as claimed in claim 3, wherein the modifying agent is dissolved or dispersed in the liquid which is to form the disperse phase of the emulsion, prior to emulsification thereof.

5. A process as claimed in claim 4, wherein the modifying agent is dispersed in the liquid with the aid of a dispersing agent.

6. A process as claimed in claim 1, wherein the modifying agent is present in an amount of from 0.5 to 80 percent of the weight of the disperse polymer to be formed.

7. A process as claimed in claim 1, wherein there is also present a further polymer-forming reactant which is soluble in the liquid medium of the dispersion.

8. A process as claimed in claim 1, wherein the emulsifying agent is a simple block copolymer consisting of two chain-like components.

9. A process as claimed in claim 1, wherein the emulsifying agent is a copolymer comprising a polymeric backbone providing one type of component and carrying, as one or more side chains, components of the other type.

10. A process as claimed in claim 1, wherein the emulsifying agent comprises a polymer backbone from which are pendant side chains providing the two types of chain-like components required.

11. A process as claimed in claim 1, wherein the liquid disperse phase of the emulsion constitutes from 10 to 75 percent by volume of the total reaction composition.

12. A process as claimed in claim 1, wherein the reactant present in a liquid disperse phase of the emulsion is present as a solution, of concentration from 10 to 90 percent by weight, in a second inert liquid which is immiscible with the liquid dispersion medium.

* * * * *